United States Patent [19]

Freeman

[11] Patent Number: 4,820,478

[45] Date of Patent: Apr. 11, 1989

[54] NUCLEAR REACTOR CONTROL ROD WITH UNIFORMLY CHANGEABLE AXIAL WORTH

[75] Inventor: Thomas R. Freeman, Greensburg, Pa.

[73] Assignee: Westinghouse Electric Corp., Pittsburgh, Pa.

[21] Appl. No.: 89,387

[22] Filed: Aug. 25, 1987

Related U.S. Application Data

[62] Division of Ser. No. 816,780, Jan. 7, 1986, Pat. No. 4,707,329.

[51] Int. Cl.$^4$ .............................................. G21C 7/10
[52] U.S. Cl. .................................................... 376/333
[58] Field of Search ........................ 376/333, 327, 332

[56] References Cited

U.S. PATENT DOCUMENTS

| 4,342,722 | 8/1982 | Blum | 376/327 |
| 4,696,793 | 9/1987 | Paul et al. | 376/333 |

FOREIGN PATENT DOCUMENTS

| 1049014 | 1/1959 | Fed. Rep. of Germany | 376/332 |
| 1151608 | 7/1963 | Fed. Rep. of Germany | 376/333 |
| 1207522 | 12/1965 | Fed. Rep. of Germany | 376/333 |
| 5137396 | 3/1976 | Japan | 376/333 |

Primary Examiner—Harvey E. Behrend

[57] ABSTRACT

A control rod for use in a nuclear reactor core to provide xenon compensation includes an elongated inner cylindrical member and an elongated outer cylindrical member surrounding the inner member. Each of the members is composed of axially-extending, alternating black poison and nonpoison regions. Also, the inner member is axially movable relative to the outer member to adjust the degree to which the poison regions of the members overlap with the nonpoison regions thereof and thereby change the overall worth of the rod in an axially uniform manner. The inner cylindrical member has a solid cross-sectional configuration, whereas the outer cylindrical member has an annular cross-sectional configuration and concentrically surrounds the inner member. Each of the poison regions in the members is about the same axial height, while each of the nonpoison regions is about the same axial height. The guide thimble of a fuel assembly in which the control rod is placed has an annular stop being sized to support a lower end of the outer member for retaining the outer member in a stationary position therein, whereas the stop has a central hole sized to allow passage of a lower end of the inner member therethrough in order to move the inner member axially relative to the outer member to adjust the degree to which the poison regions of the members overlap with the nonpoison regions thereof and thereby change the overall worth of the rod.

6 Claims, 3 Drawing Sheets

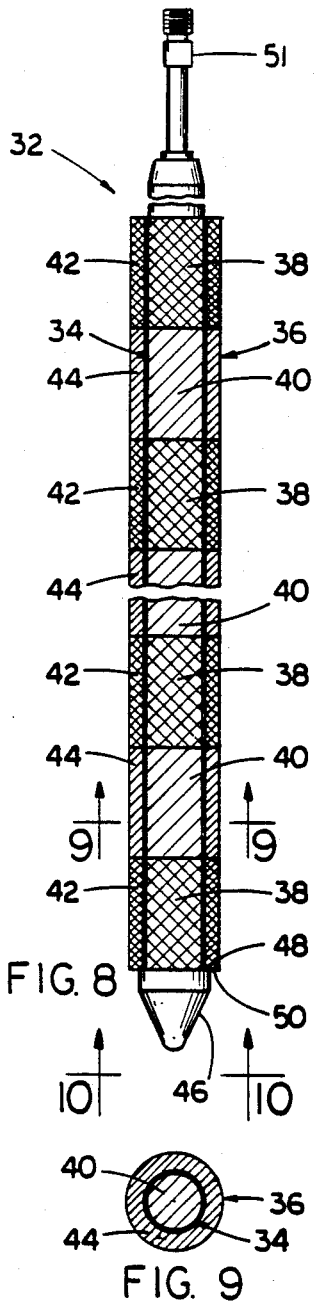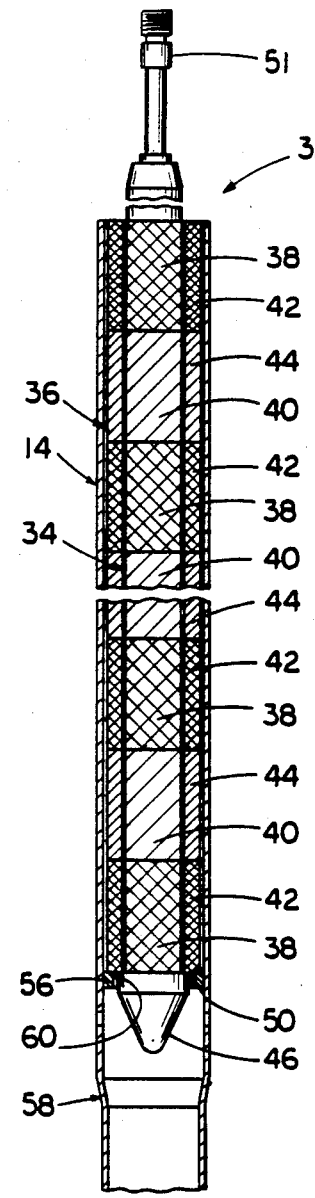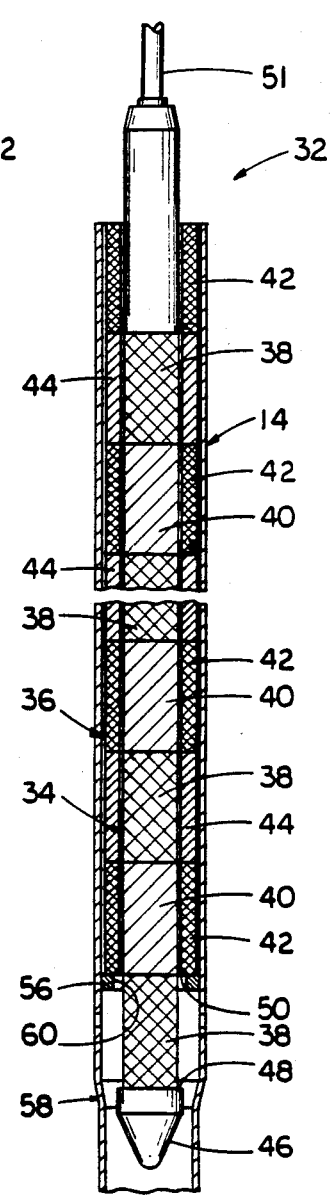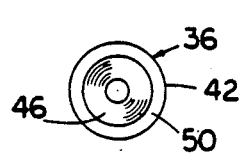

NUCLEAR REACTOR CONTROL ROD WITH UNIFORMLY CHANGEABLE AXIAL WORTH

This is a divisional of co-pending application Ser. No. 816,780 filed on 1/07/86, now U.S. Pat. No. 4,707,329.

BACKGROUND OF THE INVENTION

1. Field of the Invention

The present invention relates generally to fuel assemblies for nuclear reactors and, more particularly, is concerned with a unique control rod design in which the worth of the control rod can be changed approximately uniformly in the axial direction of the rod.

2. Description of the Prior Art

In a typical nuclear reactor, the reactor core includes a large number of fuel assemblies each of which is composed of top and bottom nozzles with a plurality of elongated transversely spaced guide thimbles extending longitudinally between the nozzles and a plurality of transverse support grids axially spaced along and attached to the guide thimbles. Also, each fuel assembly is composed of a plurality of elongated fuel elements or rods transversely spaced apart from one another and from the guide thimbles and supported by the transverse grids between the top and bottom nozzles. The fuel rods each contain fissile material and are grouped together in an array which is organized so as to provide a neutron flux in the core sufficient to support a high rate of nuclear fission and thus the release of a large amount of energy in the form of heat. A liquid coolant is pumped upwardly through the core in order to extract some of the heat generated in the core for the production of useful work.

Since the rate of heat generation in the reactor core is proportional to the nuclear fission rate, and this, in turn, is determined by the neutron flux in the core, control of heat generation at reactor start-up, during its operation and at shutdown is achieved by varying the neutron flux. Generally, this is done by absorbing excess neutrons using control rods which contain neutron absorbing material. The guide thimbles, in addition to being structural elements of the fuel assembly, also provide channels for insertion of the neutron absorber control rods within the reactor core. The level of neutron flux and thus the heat output of the core is normally regulated by the movement of the control rods into and from the guide thimbles.

One common arrangement utilizing control rods in association with a fuel assembly can be seen in U.S. Pat. No. 4,326,919 to Hill and assigned to the assignee of the present invention. This patent shows an array of control rods supported at their upper ends by a spider assembly, which in turn is connected to a control rod drive mechanism that vertically raises and lowers (referred to as a stepping action) the control rods into and out of the hollow guide thimbles of the fuel assembly. The typical construction of the control rod used in such an arrangement is in the form of an elongated metallic cladding tube having a neutron absorbing material disposed within the tube and with end plugs at opposite ends thereof for sealing the absorber material within the tube. Generally, the neutron absorbing material is in the form of a stack of closely packed ceramic or metallic pellets which only partially fill the tube, leaving a void space or axial gap between the top of the pellets and the upper end plug in defining a plenum chamber for receiving gases generated during the control operation. A coil spring is disposed within this plenum chamber and held in a state of compression between the upper end plug and the top pellet so as to maintain the stack of pellets in their closely packed arrangement during stepping of the control rod.

Thus, control rods affect reactivity by changing direct neutron absorption. Control rods are used for fast reactivity control. A chemical shim such as boric acid dissolved in the coolant is used to control long term reactivity changes. More uniformly distributed throughout the core, the boron solution leads to a more uniform power distribution and fuel depletion than do control rods. The concentration of boron is normally decreased with core age to compensate for fuel depletion and fission product buildup.

The buildup of fission products, such as Xenon-135, reduces reactivity by parasitically absorbing neutrons, thereby decreasing thermal utilization. The Xenon-135 (hereafter referred to as just "xenon") is removed by neutron absorption or by decay. Upon a reduction in core power (such as during load follow, which is a reduction in reactor power in response to a reduction in power demand), fewer thermal neutrons are available to remove the xenon and therefore the concentration of xenon in the core increases.

This increase in xenon concentration which accompanies a reduction in core reactivity is usually compensated for by either decreasing the concentration of boron dissolved in the core coolant or by withdrawing the control rods from the core. However, both of these methods have drawbacks. Changing the boron concentration requires the processing of coolant (i.e., water) which is difficult and not desired by the utility, especially towards the end of core life (EOL). Removal of control rods means that the core's return to power capability is reduced and peaking factors are increased.

The usual solution to this problem is to have several banks of reduced worth rods (i.e., grey rods) in the core at full power which are available for removal at reduced power to compensate for the xenon buildup. The drawback of this procedure is that moving these banks changes the axial offset and increases peaking factors. Also, because these reduced worth banks are in the core at power, shutdown margin can be affected.

Consequently, a need exists for a different approach to xenon compensation, one which will effectively resolve the problem of xenon buildup during load follow, but which will not raise a host of new problems in the process.

SUMMARY OF THE INVENTION

The present invention provides a unique control rod configuration designed to satisfy the aforementioned needs. Underlying the present invention is the realization that since the xenon increase at reduced power will be fairly uniform across the core and, in particular, will be axially symmetric (if the axial offset is near zero and held constant at reduced power), the ideal xenon compensation solution will be uniform across the core and in particular will also be symmetric in the axial direction. (A change in the dissolved boron concentration, which is uniform across the core, would be a satisfactory solution, except for the problems associated with bleed and feed.) In other words, the solution should match the characteristics of the problem.

The solution provided by the present invention does just that. It involves the full insertion into the core of a control rod whose worth can be changed uniformly in the axial direction during power operation. This is accomplished by a control rod composed of two cylindrical members, an inner one of solid cross-section and an outer one of annular cross-section so that the inner one fits inside the outer one. In the axial direction, each cylindrical member has successive regions which are alternately composed of a black poison (i.e., one that absorbs all neutrons) and no poison. When the two cylindrical members of the control rod are moved relative to each other, the worth of the rod will change by up to a factor of two depending on whether the poison regions of the two cylindrical members line up or not. The reason for this is that, when lined up, the black poison region of the outer cylindrical member will shield the poison region of the inner cylindrical member from neutrons which will reduce the worth of the overall rod. Because the poison and nonpoison regions uniformly alternate in the axial direction between the ends of the cylindrical members, when the position of one cylindrical member is axially adjusted relative to another cylindrical member (for example, as the inner cylindrical member is moved relative to the outer cylindrical member), the worth of the overall rod will change approximately uniformly in the axial direction.

Also, since movement of the cylindrical member only a short distance is necessary to change the rod worth, there will be very little axial offset change when the rod worth changes and consequently little peaking factor increase. Thus, the use of this dual concentric cylindrical member control rod will be about as good as changing boron concentration for xenon transient compensation as far as peaking factors are concerned. It will be better than dissolved boron for speed of action especially near EOL.

Accordingly, the present invention is directed to a control rod for use in a nuclear reactor core to provide xenon compensation. The control rod comprises: (a) an elongated inner cylindrical member; and (b) an elongated outer cylindrical member surrounding the inner member. Each of the members is composed of alternating poison and nonpoison regions. Also, one of the inner and outer members is axially movable relative to the other to adjust the degree to which the poison regions of the members overlap with the nonpoison regions thereof and thereby change the overall worth of the rod.

More particularly, the inner cylindrical member has a solid cross-sectional configuration, whereas the outer cylindrical member has an annular cross-sectional configuration and concentrically surrounds the inner member. The regions of each of the members extend axially and are alternately composed exclusively of respective black poison and nonpoison materials. Furthermore, each of the poison regions of the inner and outer members is of substantially the same axial height, while each of the nonpoison regions of the inner and outer members is of substantially the same axial height. Finally, one of the inner and outer members is axially movable relative to the other between one axially displaced position in which the poison regions of the members are disposed side-by-side and the nonpoison regions thereof are disposed side-by-side and another axially displaced position in which the poison regions of the members are disposed side-by-side with the nonpoison regions of the members so as to thereby change the overall worth of the rod in a substantially axially uniform manner.

A fuel assembly guide thimble in which the control rod is placed has means for retaining the outer member in a stationary position therein, while the inner member is movable axially relative thereto to adjust the degree to which the poison regions of the members overlap with the nonpoison regions thereof and thereby change the overall worth of the rod. Preferably, the retaining means is an annular stop fixed in the guide thimble and being sized to support a lower end of the outer member. The stop also has a central hole sized to allow passage of a lower end of the inner member therethrough. More particularly, the stop is a sleeve fixed in the guide thimble above a dashpot defined in the lower portion of the thimble. Also, the inner member has an outwardly projecting ledge defined on a lower end thereof upon which rests a lower end of the outer member for retaining the outer member about the inner member before the outer member rests on the guide thimble stop.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 8 is an enlarged elevational view of the two concentric cylindrical members composing the control rod being assembled together, with their axially alternating black poison and nonpoison regions being aligned with one another and the lower end of the outer cylindrical member resting on a ledge formed on the lower end of the inner cylindrical member, the cylindrical members of the rod being shown in vertically foreshortened, longitudinally sectioned form.

FIG. 9 is a sectional view of the two assembled concentric cylindrical members of the control rod as taken along line 9—9 of FIG. 8.

FIG. 10 is a bottom plan view of the control rod as seen along line 10—10 of FIG. 8.

FIG. 11 is a view of the control rod similar to that of FIG. 8, but with the control rod disposed within one of the guide thimbles of the fuel assembly of FIG. 1 and the lower end of the outer cylindrical member resting on the guide thimble annular stop and the lower ledge of the inner cylindrical member.

FIG. 12 is a view similar to that of FIG. 11, but with the inner cylindrical member of the control rod displaced downwardly relative to the outer cylindrical member, the axially alternating black poison and nonpoison regions of the inner cylindrical member being aligned respectively with the nonpoison and black poison regions of the outer cylindrical member, and the lower end of the outer cylindrical member resting only on the guide thimble annular stop.

DETAILED DESCRIPTION OF THE INVENTION

Figure 1:
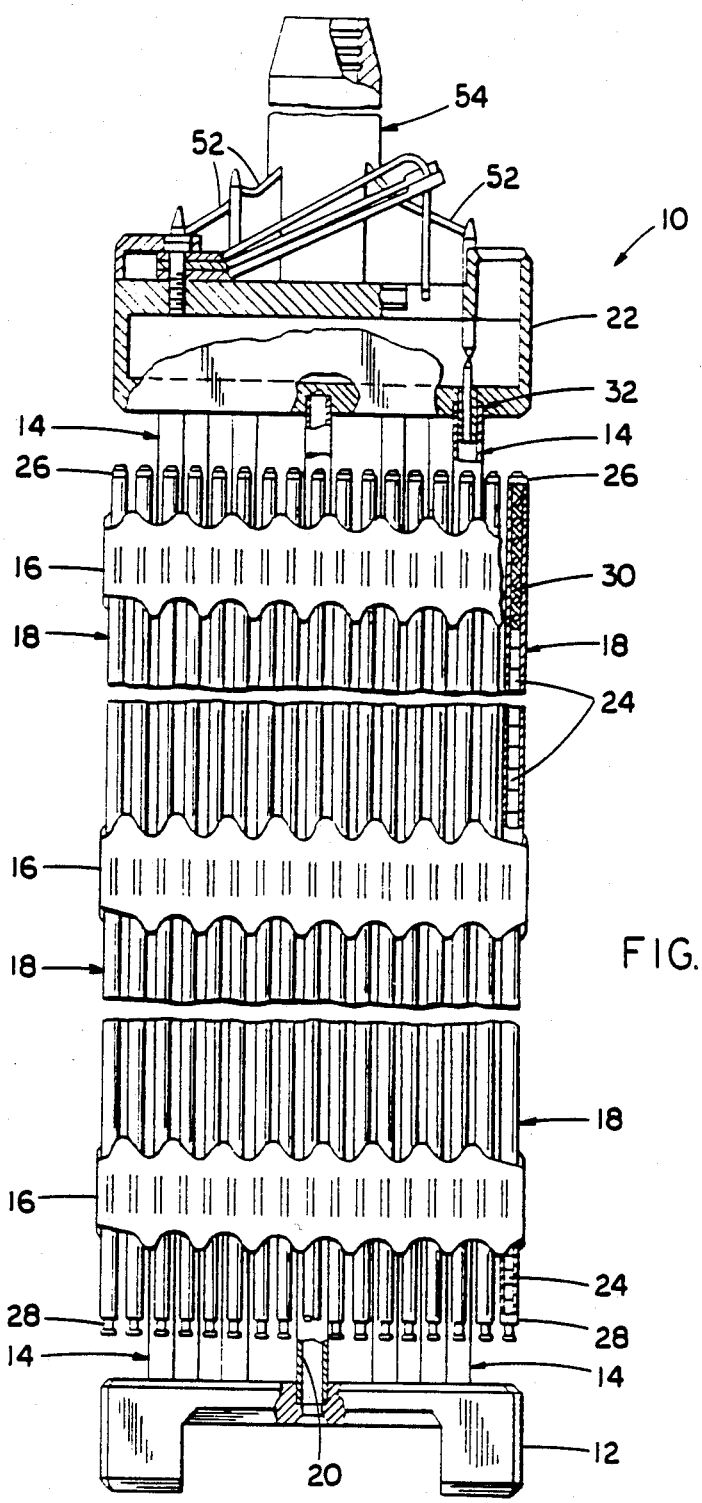
FIG. 1 is a side elevational view, with parts partially sectioned and broken away for purposes of clarity, of a fuel assembly in which are employed control rods constructed in accordance with the principles of the present invention.
Figure 2:
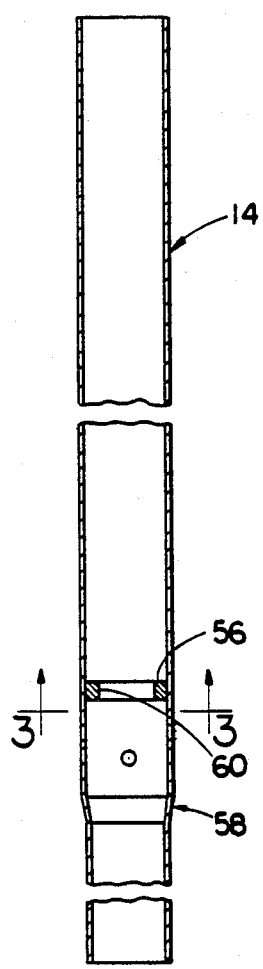
FIG. 2 is an enlarged fragmentary detailed sectional view of one of the guide thimbles of the fuel assembly of FIG. 1, showing an annular stop in the guide thimble just above its lower dashpot section upon which rests the lower end of the outer one of the two concentric cylindrical members composing the control rod.
Figure 4:
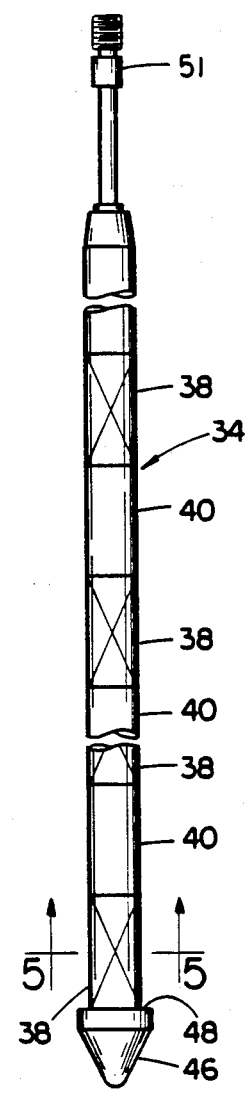
FIG. 4 is an enlarged elevational view, in vertically foreshortened form, of the inner one of the two concentric cylindrical members of the control rod.
Figure 6:
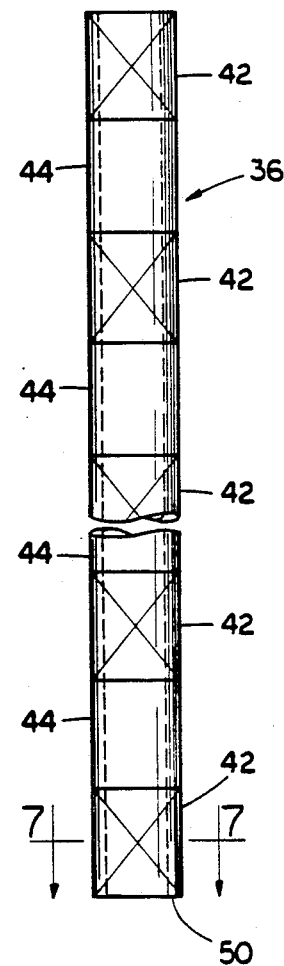
FIG. 6 is an enlarged elevational view, in vertically foreshortened form, of the outer one of the two concentric cylindrical members of the control rod.
Figure 3:
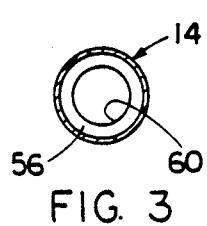
FIG. 3 is a bottom plan view of the guide thimble stop as taken along line 3—3 of FIG. 2.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an elevational view of a nuclear reactor fuel assembly, represented in vertically foreshortened form and being generally designated by the numeral 10. Basically, the fuel assembly 10 includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 removably attached to the upper ends of the guide thimbles 14 to form an integral assembly capable of being conventionally handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24 and the opposite ends of the rod are closed by upper and lower end plugs 26,28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the nuclear reactor. A liquid moderator/coolant such as water, or water containing boron, is pumped upwardly through the fuel assemblies of the core in order to extract heat generated therein for the production of useful work.

Control Rod With Uniformly Changeable Axial Worth

Turning now to FIGS. 2 to 12, there is shown the preferred embodiment of the control rod of the present invention, being generally designated 32, which can be used in some of the fuel assemblies 10 of the reactor core to compensate for xenon transients, such as occur at load follow when the reactivity of the core is reduced. As will become clear, the control rod 32 constitutes means which compensates for the reduction in reactivity in a manner which matches it generally uniformly in a transverse direction and symmetric in the axial direction. Basically, the control rod 32 includes an elongated inner cylindrical member 34 and an elongated outer cylindrical member 36 surrounding the inner member, with each of the members 34,36 being composed respectively of alternating poison and nonpoison regions 38,40 and 42,44 (in FIGS. 4 and 6, the poison regions have an "X" on them) and with one of the inner and outer members 34,36 being axially movable relative to the other to adjust the degree to which the poison regions 38,42 of the members 34,36 overlap with the nonpoison regions 40,44 thereof and thereby change the overall worth of the rod 32.

Figure 5:
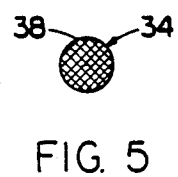
FIG. 5 is a sectional view of the inner cylindrical member as taken along line 5—5 of FIG. 4.
Figure 7:
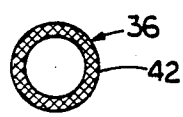
FIG. 7 is a sectional view of the outer cylindrical member as taken along line 7—7 of FIG. 6.

More particularly, as seen in FIG. 5, the inner cylindrical member 34 from end to end has a solid cross-sectional configuration, whereas, as seen in FIG. 7, the outer cylindrical member 36 from end to end has an annular cross-sectional configuration and concentrically surrounds and is generally coextensive with the inner member 34, as seen in FIGS. 8 and 9. The poison regions 38,42 of the respective members 34,36 are composed exclusively of black poison material, such as unclad hafnium, and extend axially in an alternating arrangement with the nonpoison regions 40,44 of the members which are composed exclusively of a nonpoison material, such as Zirc-4. The regions of the members can be in the form of poison and nonpoison annular and solid pellets and thus the members themselves are formed by connecting the respective pellets together in any suitable manner, such as by welding them. It will be observed that there is no cladding material needed, and no plenum is needed since no oxide material is used and thus no reaction gas is given off. As will be observed in FIG. 8, each of the black poison regions 38,42 of the inner and outer members 34,36 has substantially the same axial height. Also, each of the nonpoison regions 40,44 of the members 34,36 has substantially the same axial height. Additionally, preferably the axial heights of the poison regions 38,42 are about the same as the nonpoison regions 40,44. A height of one foot for the regions was arbitrarily chosen. Such height was considered to be short enough to not cause significant axial offset changes with rod movement. The inner member 34 has a conical shaped lower head 46 which defines an outwardly projecting annular ledge 48 at the lower end of the member 34 upon which rests on an inner portion of a lower edge 50 of the outer member 36, as seen in FIGS. 8 and 10. In uch manner, the inner cylindrical member 34 supports the outer cylindrical member 36 prior to insertion of the control rod 32 into one of the guide thimbles 14 of the fuel assembly 10.

The control rod 32 is placed in one guide thimble 14 of the fuel assembly 10 at beginning of core life (BOL). The inner or central member 34 is connected at an upper threaded end 51 to the control rod drive line, in the same manner as a conventional control rod, through a radially extending fluke or arm 52 of a conventional spider assembly 54, as seen in FIG. 1. As the inner cylindrical member 34 is lowered into the guide thimble 14, the outer cylindrical member 36 rides along with the inner member 34 by sitting on the lower ledge 48 of the inner member. When the two members 34,36 are almost completely inserted into the core, i.e., the guide thimble 14 of the fuel assembly 10, an outer portion of the lower edge 50 of the outer cylindrical member 36 encounters an annular stop 56 in the form of a sleeve in a lower portion of the guide thimble 14, for instance, fixed to the thimble 14 just above a dashpot 58 defined in its lower portion. The sleeve 56 is sized to support the outer portion of the lower edge 50 of the outer member 36 and has a central hole 60 sized to allow passage of the inner member 34 therethrough.

While the outer member 36 encounters the stop 56, the inner member 34 can still continue down relative to the outer member 36 an additional foot to full insertion, as seen in FIG. 12. In such offset position of the poison and nonpoison regions 38,40 and 42,44 of the members 34,36, the control rod 32 has its maximum worth. At full reactor power, the members 34,36 are in the offset position so that they have maximum worth.

To adjust the degree to which the poison regions 38,42 of the cylindrical members 34,36 overlap with the nonpoison regions 40,44 thereof and thereby change the overall worth of the rod 32, the inner member 34 is withdrawn upwardly relative to the outer member 36. At the aligned position of the poison and nonpoison regions 38,40 and 42,44 of the members 34,36, as seen in FIG. 11, the control rod 32 has its minimum worth, since the poison regions 42 in the outer member 36 shields the poison regions 38 in the inner member 34 from neutrons. In summary, therefore, the inner member 34 is axially movable relative to the outer member 36 between an upper axially displaced position (FIG. 12), in which the black poison regions 38,42 of the members 34,36 are disposed in side-by-side alignment and the nonpoison regions 40,44 thereof are also disposed in side-by-side alignment, and a lower axially displaced position (FIG. 11), in which the black poison regions 38,42 of the members 34,36 are disposed in side-by-side alignment with the nonpoison regions 40,44 of the members. In such manner, the overall worth of the control rod 32 can be changed in a substantially axially uniform manner.

While the annular sleeve 56 fixed in the guide thimble 14 is the means illustrated herein for supporting and retaining the outer member 36 in a stationary position in the guide thimble 14 while the inner member 34 is movable axially thereto between the aligned and offset positions of the poison and nonpoison regions 38,42 and 40,44, respectively shown in FIGS. 11 and 12, it will be readily understood that other means could be used to accomplish this same purpose. For example, the outer cylindrical member 36 could engage a stop associated with the top nozzle to hold it stationary in the guide thimble 14.

The xenon compensating control rods 32 are not used for power reduction because they do not control the change in axial offset which results as power is decreased. However, the rods might be used to also compensate for the Doppler reactivity which is changed during load follow since these changes are also symmetric in the axial direction. If Doppler control is to be performed, then the rods would not be in their most absorbing condition at full power so that their worth could be increased at reduced power to cancel the Doppler reactivity increase.

For use just in xenon control, the rods are at their highest worth position at full power, as mentioned above. At reduced power, their worth would be decreased to compensate for the xenon concentration buildup. Since the regular control rods inserted to reduce power have not had to be withdrawn to compensate for xenon, there is enough worth in the core so that it can be returned to full power as fast as permissible.

The xenon compensating rods have, therefore, preserved return to power capability and have removed the requirement of changing dissolved boron concentration in the core during load follow. Also, the rods are removed before EOL so that there is no fuel cycle penalty associated with their being in the core. They may not all be withdrawn at once, but in stages.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. A control rod for use in a nuclear reactor core to provide xenon compensation, comprising:
   (a) an elongated inner cylindrical member having a lower end; and
   (b) an elongated outer cylindrical member surrounding said inner member and having a lower end with concentrically-arranged inner and outer edge portions defined thereon;
   (c) each of said members being composed of alternating poison and nonpoison regions;
   (d) said inner member being axially movable relative to said outer member to adjust the degree to which said poison regions of said members overlap with said nonpoison regions thereof and thereby change the overall worth of said rod;
   (e) said lower end of said inner member having defined thereon a radially outwardly projecting ledge for supporting in a rest relationship thereon said lower end of said outer member at only its inner edge portion for retaining said outer member about said inner member, said outer edge portion of said outer member lower end extending radially outwardly from said inner edge portion thereof and from said ledge on said inner member lower end for providing an exposed abutment engagable with a guide thimble stop structure to maintain said outer member in a stationary position upon axial movement of said inner member which moves its ledge away from said inner edge portion of said outer member lower end to change the degree in which said poison regions of said members overlap with said nonpoison regions thereof.

2. The control rod as recited in claim 1, wherein:
   said inner cylindrical member has a solid cross-sectional configuration; and
   said outer cylindrical member has an annular cross-sectional configuration and concentrically surrounds said inner member.

3. The control rod as recited in claim 1, wherein said regions of each of said members extend axially and are alternately composed exclusively of respective black poison and nonpoison materials.

4. The control rod as recited in claim 1, wherein:
   each of said poison regions of said inner and outer member is of substantially the same axial height; and
   each of said nonpoison regions of said inner and outer members is of substantially the same axial height.

5. The control rod as recited in claim 4, wherein one of said inner and outer members is axially movable relative to the other between one axially displaced position in which said poison regions of said members are disposed side-by-side and said nonpoison regions thereof are disposed side-by-side and another axially displaced are disposed side-by-side with said nonpoison regions of said members so as to thereby change the overall worth of said rod in a substantially axially uniform manner.

6. A control rod for use in a nuclear reactor core to provide xenon compensation, comprising:
    (a) an elongated inner cylindrical member being of a solid cross-sectional configuration from end to end and having a lower end; and
    (b) an elongated outer cylindrical member being of an annular cross-sectional configuration from end to end and concentrically surrounding and generally coextensive with said inner member, said outer member having a lower end with concentrically-arranged lower inner and outer edge portions defined thereon;
    (c) each of said members having axially extending regions being alternately composed exclusively of respective black poison and nonpoison materials;
    (d) each of said black poison regions of said inner and outer members being of substantially the same axial height;
    (e) each of said nonpoison regions of said inner and outer members being of substantially the same axial height;
    (f) said inner member being axially movable relative to said outer member between one axially displaced position in which said black poison regions of said members are disposed side-by-side and said nonpoison regions thereof are disposed side-by-side and another axially displaced position in which said black poison regions of said members are disposed side-by-side with said nonpoison regions of said members so as to thereby change the overall worth of said rod in a substantially axially uniform manner;
    (g) said lower end of said inner member having defined thereon a radially outwardly projecting ledge for supporting in a rest relationship thereon said lower end of said outer member at only its inner edge portion for retaining said outer member about said inner member, said outer edge portion of said outer member lower end extending radially outwardly from said inner edge portion thereof and from said ledge on said inner member lower end for providing an exposed abutment engagable with a guide thimble stop structure to maintain said outer member in a stationary position upon axial movement of said inner member which moves its ledge away from said inner edge portion of said outer member lower end to change the degree in which said poison regions of said members overlap with said nonpoison regions thereof.

* * * * *